United States Patent [19]
Koda et al.

[11] Patent Number: 5,984,176
[45] Date of Patent: Nov. 16, 1999

[54] MANUFACTURING METHOD OF ELECTRONIC DEVICES HAVING IDENTIFICATION NUMBERS

[75] Inventors: Tsutomu Koda; Toshihiro Fukuchi, both of Gifu-ken; Tsuneo Okushi, Chitose, all of Japan

[73] Assignee: Matsushita Electric Industrial Co., Ltd., Osaka, Japan

[21] Appl. No.: 08/923,120

[22] Filed: Sep. 4, 1997

Related U.S. Application Data

[63] Continuation of application No. 08/442,409, May 16, 1995, abandoned.

[30] Foreign Application Priority Data

May 25, 1994 [JP] Japan ................................ 6-111240

[51] Int. Cl.[6] ............................................ G06K 7/10
[52] U.S. Cl. ............................ 235/376; 235/375
[58] Field of Search ................................ 235/375, 385, 235/376; 29/701, 702, 703, 704

[56] References Cited

U.S. PATENT DOCUMENTS

| | | | |
|---|---|---|---|
| 4,309,600 | 1/1982 | Perry et al. | 235/375 |
| 4,514,815 | 4/1985 | Anderson | 235/385 |
| 4,591,991 | 5/1986 | Sticht | 235/375 |
| 5,038,283 | 8/1991 | Caveney | 235/385 |
| 5,231,271 | 7/1993 | Hino et al. | 235/376 |
| 5,271,642 | 12/1993 | Jahier et al. | 283/81 |
| 5,329,102 | 7/1994 | Sansone | 235/375 |
| 5,340,968 | 8/1994 | Watanabe et al. | 235/385 |
| 5,353,230 | 10/1994 | Maejima et al. | 235/375 |
| 5,362,949 | 11/1994 | Gulick | 235/385 |
| 5,367,148 | 11/1994 | Storch et al. | 235/375 |
| 5,393,965 | 2/1995 | Bravman et al. | 235/383 |
| 5,434,870 | 7/1995 | Benton et al. | 371/37.1 |
| 5,449,201 | 9/1995 | Miller et al. | 283/79 |
| 5,478,990 | 12/1995 | Montanari et al. | 235/375 |
| 5,621,647 | 4/1997 | Kraemer et al. | 235/375 |

FOREIGN PATENT DOCUMENTS 61-69748  7/1986  Japan ................................ 235/454

*Primary Examiner*—Donald Hajec
*Assistant Examiner*—Mark Tremblay
*Attorney, Agent, or Firm*—Stevens, Davis, Miller & Mosher, L.L.P.

[57] ABSTRACT

A manufacturing method comprises the steps of changing an identification number of each electronic device 15 into a bar code and adhering it to an electronic component 18, reading the bar code 12a, and writing information of the bar code in a memory of the electronic device 15. All the steps for writing identification numbers are automated so that human errors in setting the identification numbers by an operator can be prevented.

4 Claims, 4 Drawing Sheets

MANUFACTURING METHOD OF ELECTRONIC DEVICES HAVING IDENTIFICATION NUMBERS

This application is a continuation of application Ser. No. 08/442,409, filed May 16,1995 (abandoned).

BACKGROUND OF THE INVENTION

The present invention relates to a manufacturing method of electronic devices having identification numbers used for a cable television (hereinafter referred to as CATV) or the like.

In the CATV system, each CATV receiving set (hereinafter referred to as an electronic device) requires individual service, and therefore, each of such electronic devices must be identified. In order to identify each electronic device, an identification number peculiar to the electronic device is stored in a memory of the electronic device in manufacturing. A conventional manufacturing method of electronic devices having identification numbers will now be described.

The conventional manufacturing method of electronic devices having identification numbers comprises the steps of writing different identification numbers of the respective electronic devices in a management file by the operator, setting the identification numbers written in the management file in an identification number writing device, and writing the set identification numbers in the electronic devices.

However, in the conventional method, writing of the identification numbers is manually conducted by an operator, and consequently, errors inevitably occur in setting the numbers in the identification number writing device.

SUMMARY OF THE INVENTION

Therefore, to solve the above-described problem, it is an object of the present invention to provide a manufacturing method of electronic devices by which human errors do not occur in relation to writing of identification numbers in the electronic devices.

In order to achieve the above object, according to the invention, there is provided a manufacturing method of electronic devices having identification numbers, comprising the steps of issuing a bar code label on which an identification number peculiar to each electronic device is printed, adhering the bar code label to the electronic device, reading the bar code label of the electronic device, and writing information of the bar code label in a memory of the electronic device.

This manufacturing method comprises the steps of changing the identification number of the electronic device into the bar code and adhering it to the electronic device, reading the bar code of the electronic device, and writing information of the bar code in the memory of the electronic device. That is to say, all the steps for writing identification numbers are automated so that human errors in setting the identification numbers by an operator can be prevented.

DETAILED DESCRIPTION OF THE PREFERRED EMBODIMENT

One embodiment of the present invention will be hereinafter described with reference to the attached drawings.

Figure 1:
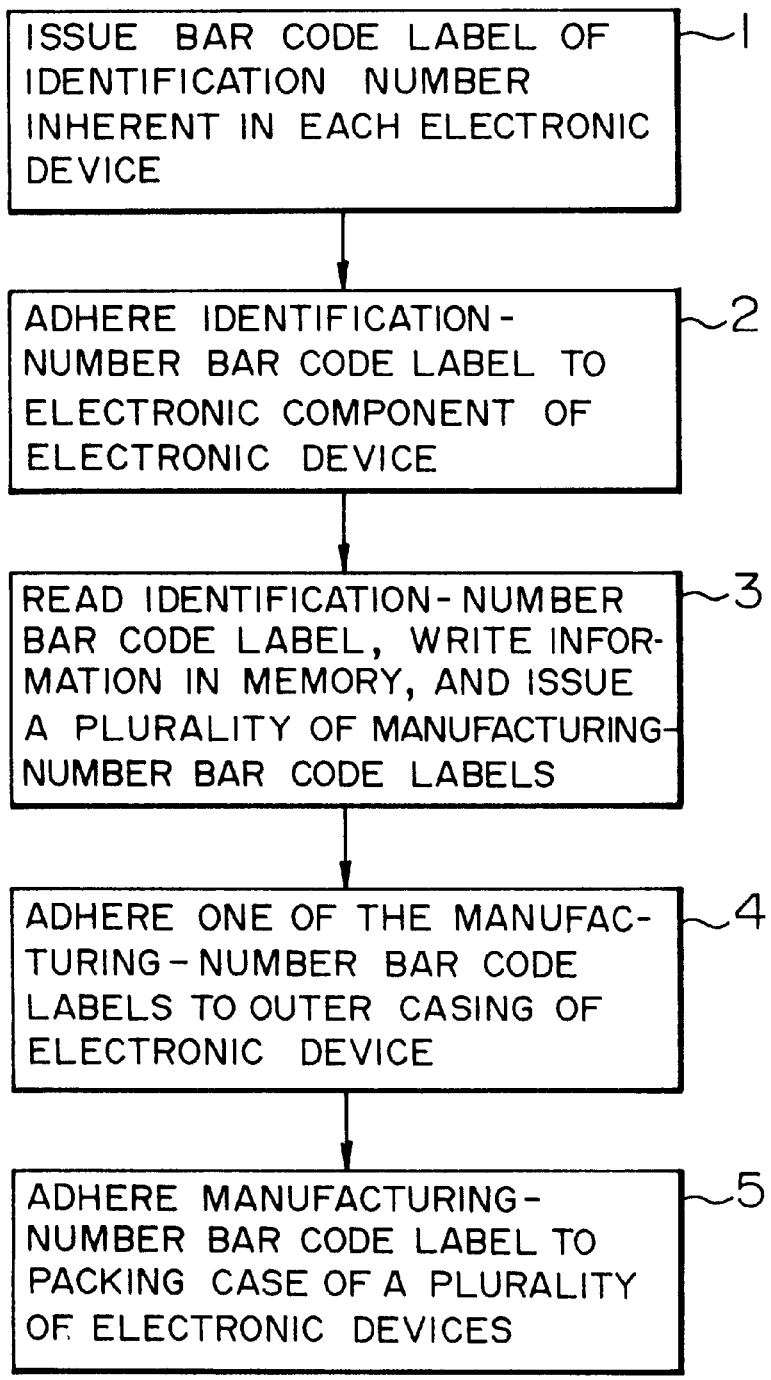
FIG. 1 is a flow chart showing the steps of a manufacturing method of electronic devices having identification numbers according to one embodiment of the present invention.
Figure 2:
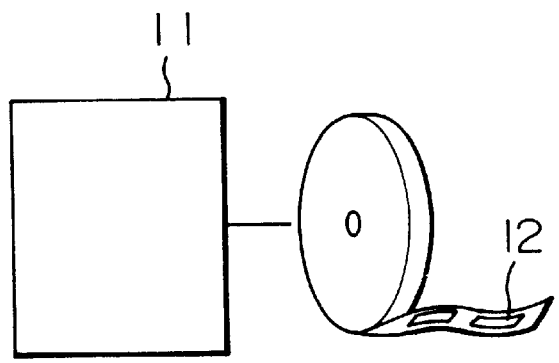
FIG. 2 is a diagram showing the step of issuing an identification-number bar code label in the manufacturing method in FIG. 1.
Figure 2:
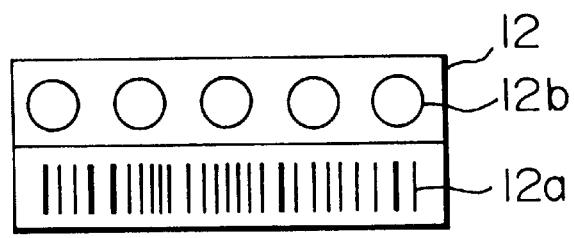

Referring to FIG. 1, in a step 1 for issuing a bar code label on which an identification number peculiar to each electronic device is printed, an identification-number bar code label 12 is issued by a bar code label printer 11, as shown in FIG. 2. In the bar code label 12, reference numeral 12a denotes a bar code of an identification number, and 12b denotes digits corresponding to the bar code 12a. Through digits 12b, the operator can perceive the contents of the bar code 12a. Since the bar code label 12 is issued by the bar code label printer 11, it can be easily controlled not to issue a plurality of labels of the same contents.

Figure 3:
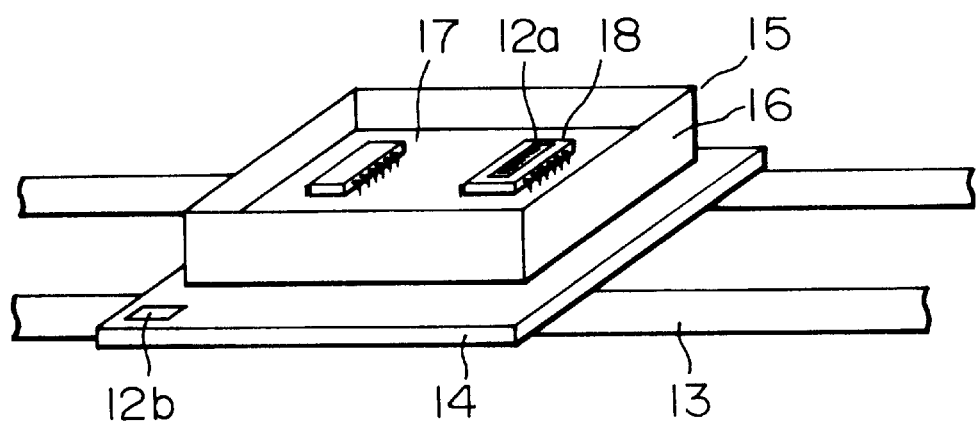
FIG. 3 is a diagram showing the step of adhering the identification-number bar code label in the manufacturing method in FIG. 1.

This step is followed by a step 2, as shown in FIG. 1, in which the identification-number bar code label is adhered to a printed board or an electronic component provided on the printed board in the electronic device. As shown in FIG. 3, the electronic device 15 is mounted on a pallet 14 on a belt conveyer 13. The printed board 17 is mounted in a chassis 16 of the electronic device 15. The bar code 12a printed in a portion the bar code label 12 is adhered to the top surface of the electronic component 18 provided on the printed board 17. The portion of the bar code 12a may be directly adhered to the printed board 17. In either case, it is a significant factor that the portion of the bar code 12a is integral with the printed board 17 on which a memory where the identification number is stored is mounted. Thus, the printed board 17 can be conformed to the chassis 16.

Further, a digits label 12b corresponding to the bar code 12a is adhered to the pallet 14, so that the operator can easily perceive the identification number of the electronic device 15.

Figure 4:
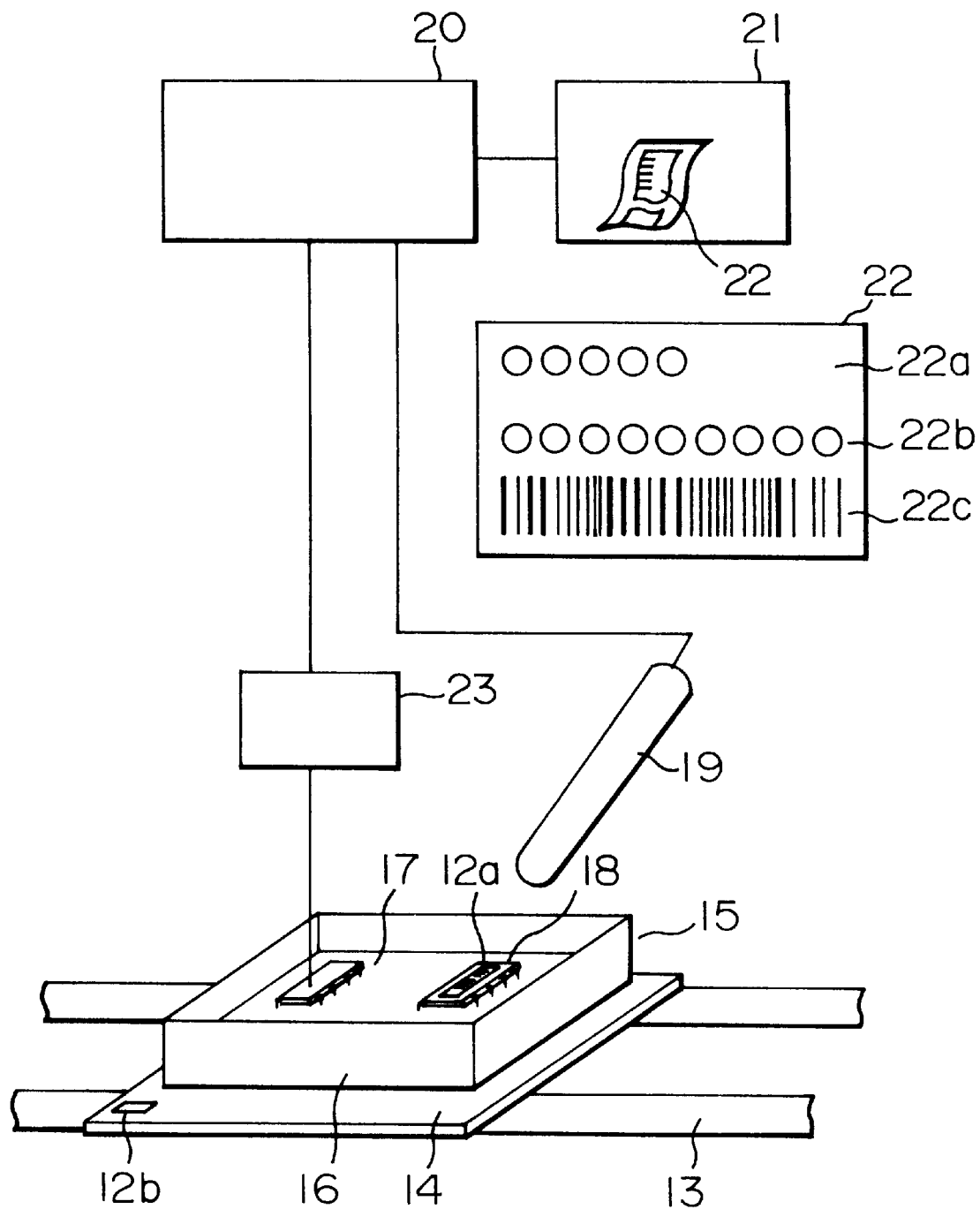
FIG. 4 is a diagram showing the step of writing the identification number in a memory and issuing a manufacturing-number bar code label in the manufacturing method in FIG. 1.

This step is followed by a step 3, as shown in FIG. 1, in which the identification-number bar code 12a is read, and there are issued a plurality of manufacturing-number bar code labels on each of which the identification number thus read and a manufacturing number of the electronic device 15 are printed, and also, information of the identification-number bar code label is written in the memory of the electronic device 15. The step 3 is effected as shown in FIG. 4. More specifically, the bar code 12a adhered to the electronic component 18 is read by a bar code reader 19. In response to this information, a control unit 20 controls a label printer 21 to issue manufacturing-number bar code labels 22. A model number 22a, the manufacturing number and the identification number 22b previously read of the electronic device 15 are printed on each of the manufacturing-number bar code labels 22. These numbers are printed in alphabets and digits so that the operator can perceive the information. The information of the numbers 22a and 22b are printed on a portion 22c in the form of a bar code. Two of such manufacturing-number bar code labels 22 are printed. However, only one of the manufacturing-number bar code labels 22 may be printed at a time, and the other may be printed every time five electronic devices 15 are manufactured.

The identification number read by the bar code reader 19 is written in the memory mounted on the printed board 17 in the electronic device 15 by a memory writing device 23 which is controlled by the control unit 20. This writing operation is disclosed in detail in Japanese Patent Application No. 6-57342.

In this manner, writing of the identification number can be automatically performed without operation by the operator, thereby preventing human errors. Moreover, automatic writing enables an increase in the productivity.

Figure 5:
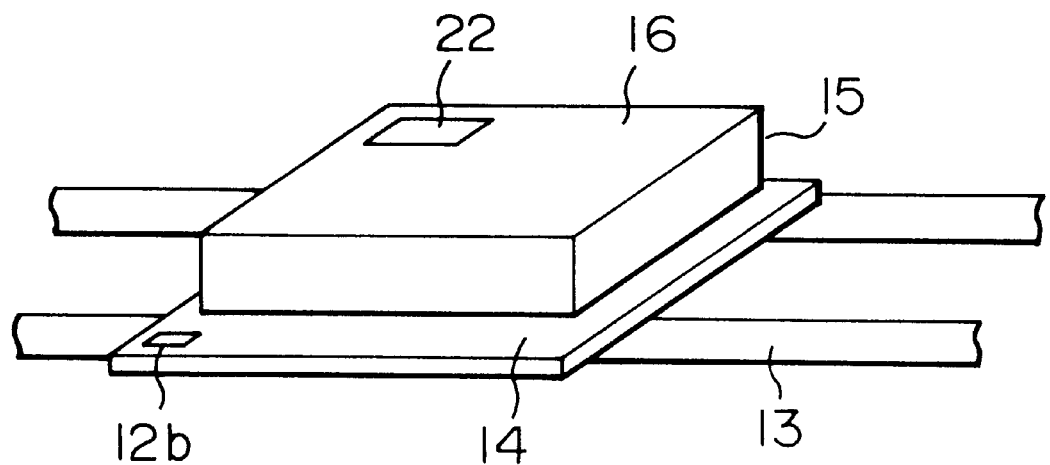
FIG. 5 is a diagram showing the step of adhering the manufacturing-number bar code label in the manufacturing method in FIG. 1.

This step is followed by a step 4, as shown in FIG. 1, in which the first one of the plurality of manufacturing-number bar code labels 22 is adhered to the chassis 16 (used as an example of the outer casing) of the electronic device 15. The step 4 is effected as shown in FIG. 5. More specifically, the electronic device 15 is turned upside down on the pallet 14. Then, one of the two manufacturing-number bar code labels 22 which have been issued in the previous step is adhered to the back surface of the chassis 16 of the electronic device 15.

At this time, the operator confirms whether or not the digits 12b accord with the identification number disclosed in the digit portion 22b of the manufacturing-number bar code label 22. If the numbers do not accord with each other, the pallet 14 and the electronic device 15 must be removed from the manufacturing line.

This step is followed by a final step 5, as shown in FIG. 1, in which the second one of the plurality of manufacturing-number bar code labels 22 is adhered to the front surface of a packing case for packing a plurality of the electronic devices. The step 5 is effected as shown in FIG. 6.

Figure 6:
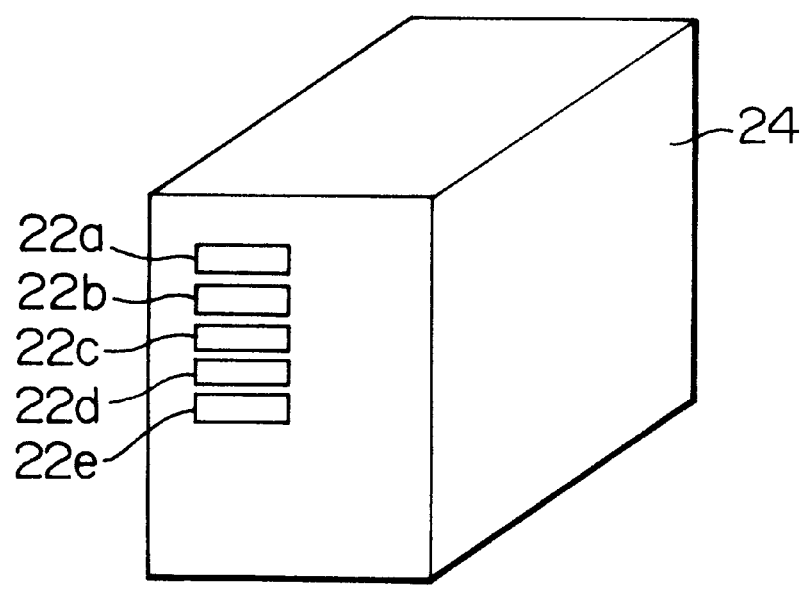
FIG. 6 is a diagram showing the step of adhering the manufacturing-number bar code label to a packing case in the manufacturing method in FIG. 1.

More specifically, referring to FIG. 6, five electronic devices 15 are packed in the packing case 24. Manufacturing-number bar code labels 22 (22a, 22b, 22c, 22d and 22e) of the electronic devices 15 in the packing case 24 are adhered to the front surface of the packing case 24.

It should be noted that if manufacturing-number bar codes for five electronic devices are printed on a single label in the step 3 of FIG. 1, this label with the five manufacturing-number bar codes is adhered to the packing case 24.

As has been described heretofore, the manufacturing method of electronic devices having identification numbers according to the present invention comprises the steps of issuing a bar code label on which an identification number peculiar to each electronic device is printed, adhering the bar code to the electronic device, and reading the bar code and writing information of the bar code in the memory of the electronic device. This manufacturing method comprises the steps of changing the identification number of the electronic device into the bar code and adhering it to the electronic device, reading the bar code, and writing information of the bar code in the memory of the electronic device. That is to say, all the steps for writing identification numbers are automated so that human errors in setting the identification numbers by the operator can be prevented.

Furthermore, writing into the memory can be automatically performed without the operator's manual operation, thereby increasing the productivity.

What is claimed is:

1. A method of manufacturing electric devices having identification numbers using a pallet of a production line, comprising the steps of:
   (a) issuing an identification-number bar code label on which information relating to an identification number peculiar to each electronic device is printed and a digit label on which said identification number is printed,
   (b) adhering said identification-number bar code label to a printed board in a chassis of said electronic device or an electronic component provided on the printed board,
   (c) adhering said digit label to said pallet on which said electronic device is disposed,
   (d) reading said identification-number bar code label,
   (e) issuing a manufacturing-number bar code label on which digits of the identification number read in step (d) and information relating to a manufacturing number of said electronic device are printed,
   (f) writing information corresponding to said identification number in a memory of said electronic device,
   (g) performing a step wherein said identification-number bar code label is covered from view on said pallet such that said information relating to the identification number printed on said identification-number bar code label, which is adhered to said printed board or to said electronic component, is not visible to an operator working on said production line,
   (h) adhering the manufacturing-number bar code label to a back surface of said chassis or an outer casing of said electronic device, and
   (i) verifying conformity between said identification number on the digit label adhered to said pallet and digits of the identification number printed on the manufacturing-number bar code label adhered to the back surface of the chassis or the outer casing.

2. A method of manufacturing electronic devices having identification numbers using a pallet of a production line, comprising the steps of:
   (a) issuing an identification-number bar code label on which information relating to an identification number peculiar to each electronic device is printed and a digit label on which said identification number is printed,
   (b) adhering said identification-number bar code label to a printed board in a chassis of said each electronic device or an electronic component provided on the printed board,
   (c) adhering said digit label to said pallet on which said electronic device is disposed,
   (d) reading said identification-number bar code labels,
   (e) issuing a plurality of manufacturing-number bar code labels on which digits of the identification number read in step (d) and information relating to a manufacturing number of said electronic device are printed,
   (f) writing information corresponding to said identification number in a memory of said electronic device,
   (g) performing a step wherein said identification-number bar code label is covered from view on said pallet such that said information relating to the identification number printed on said identification-number bar code label, which is adhered to said printed board or to said electronic component, is not visible to an operator working on said production line,
   (h) adhering a first one of the plurality of manufacturing-number bar code labels to a back surface of said chassis or an outer casing of said electronic device, (i) verifying conformity between said identification number on the digit label adhered to said pallet and digits of the identification number printed on the manufacturing-number bar code label adhered to the back surface of the chassis or the outer casing, and (j) adhering a second one of the plurality of manufacturing-number bar code labels to the front surface of a packing case for packing a plurality of said electronic devices.

3. A method of manufacturing electronic devices according to claim 1, wherein in step (g), said electronic component is turned upside down.

4. A method of manufacturing electronic devices according to claim 2, wherein in step (g), said electronic component is turned upside down.

* * * * *